United States Patent [19]
Nielsen et al.

[11] Patent Number: 5,594,496
[45] Date of Patent: Jan. 14, 1997

[54] DETECTION OF CO-CHANNEL INTERFERENCE IN DIGITAL TELEVISION SIGNALS

[75] Inventors: Larry E. Nielsen, Chicago; Gary J. Sgrignoli, Mount Prospect, both of Ill.

[73] Assignee: Zenith Electronics Corporation, Glenview, Ill.

[21] Appl. No.: 475,713

[22] Filed: Jun. 7, 1995

[51] Int. Cl.$^6$ ........................................... H04N 5/38
[52] U.S. Cl. ........................... 348/21; 348/607; 348/470
[58] Field of Search ........................... 348/21, 608, 607, 348/611, 613, 470, 473; H04N 5/38

[56] References Cited

U.S. PATENT DOCUMENTS

| | | | |
|---|---|---|---|
| 5,040,063 | 8/1991 | Citta et al. | 348/21 |
| 5,086,340 | 2/1992 | Citta et al. | 348/21 |
| 5,452,015 | 9/1995 | Hulyalkar | 348/21 |
| 5,512,957 | 4/1996 | Hulyalkar | 348/21 |

*Primary Examiner*—Victor R. Kostak

[57] ABSTRACT

A receiver receives an ATV (e.g. HDTV) signal in an area that is subject to NTSC co-channel and other interference. The received signal is precoded at the transmitter for enabling reduction of NTSC co-channel interference in the received signal. The received signal includes field sync signals that are successively field combed to produce a subtraction signal. The subtraction signal is comb filtered to reduce NTSC co-channel interference and applied to a comparator along with the unfiltered subtraction signal. The comparator determines whether the level of NTSC co-channel interference is sufficiently great to subject the received ATV signal to comb filtering for reducing the NTSC co-channel interference.

23 Claims, 1 Drawing Sheet

DETECTION OF CO-CHANNEL INTERFERENCE IN DIGITAL TELEVISION SIGNALS

BACKGROUND OF THE INVENTION AND PRIOR ART

This invention relates in general to digitally encoded advanced television (ATV) including High Definition Television (HDTV) and particularly to ATV receivers that are operated in an area where NTSC co-channel signals and other interference exist.

In U.S. Pat. No. 5,260,793, a television receiver receives a digitally compressed ATV signal having a predetermined field sync code that is compared with a reference frame code to determine which of two paths should be used to process the signal. One of the processing paths subjects the received ATV signal, which is precoded in anticipation of NTSC co-channel interference, to a comb filter for reducing NTSC co-channel interference. The other path bypasses the comb filter. If the comb filtered field sync code yields fewer errors (i.e., is characterized by less interference or a higher S/N ratio) when compared with a reference frame code than the bypassed or direct path signal, the received ATV signal is subjected to NTSC co-channel interference reduction comb filtering. If the comparison of the combed field sync and reference codes does not produce significantly fewer errors than the comparison for the direct signal path, no comb filtering is used since the comb filter introduces a 3 dB increase in white noise. Most ATV receivers will also include adaptive channel equalizers to assist in adjusting the receiver response to optimize reception of the entire signal in response to a known equalizing (training) signal.

It is often very difficult to differentiate between cochannel interference and other types of interference. This makes the decision of whether to subject the received ATV signal to the NTSC co-channel interference rejection comb filter very difficult. For example, certain recurrent interference, such as slight DC offsets and other types of static linear distortion, can easily mislead the circuitry responsible for determining the comb filter mode. There is also difficulty associated with intersymbol interference in the ATV multi level signal which results in signal-to-noise degradation even without co-channel interference. Other interference such as "ghosts" add to the difficulty of determining the NTSC co-channel filtering mode. With the present invention, more accurate systems for determining the correct operating mode for the NTSC co-channel interference reduction system is provided.

OBJECTS OF THE INVENTION

A principal object of the invention is to provide an improved ATV receiver.

Another object of the invention is to provide an ATV receiver that can more accurately determine optimum processing with respect to NTSC co-channel and other interference.

A further object of the invention is to provide a novel method of determining the optimum signal processing path for an ATV receiver in an NTSC co-channel interference environment.

BRIEF DESCRIPTION OF THE DRAWING

These and other objects and advantages of the invention will be apparent upon reading the following description in conjunction with the drawings, in which.

DESCRIPTION OF THE PREFERRED EMBODIMENT

Figure 1:
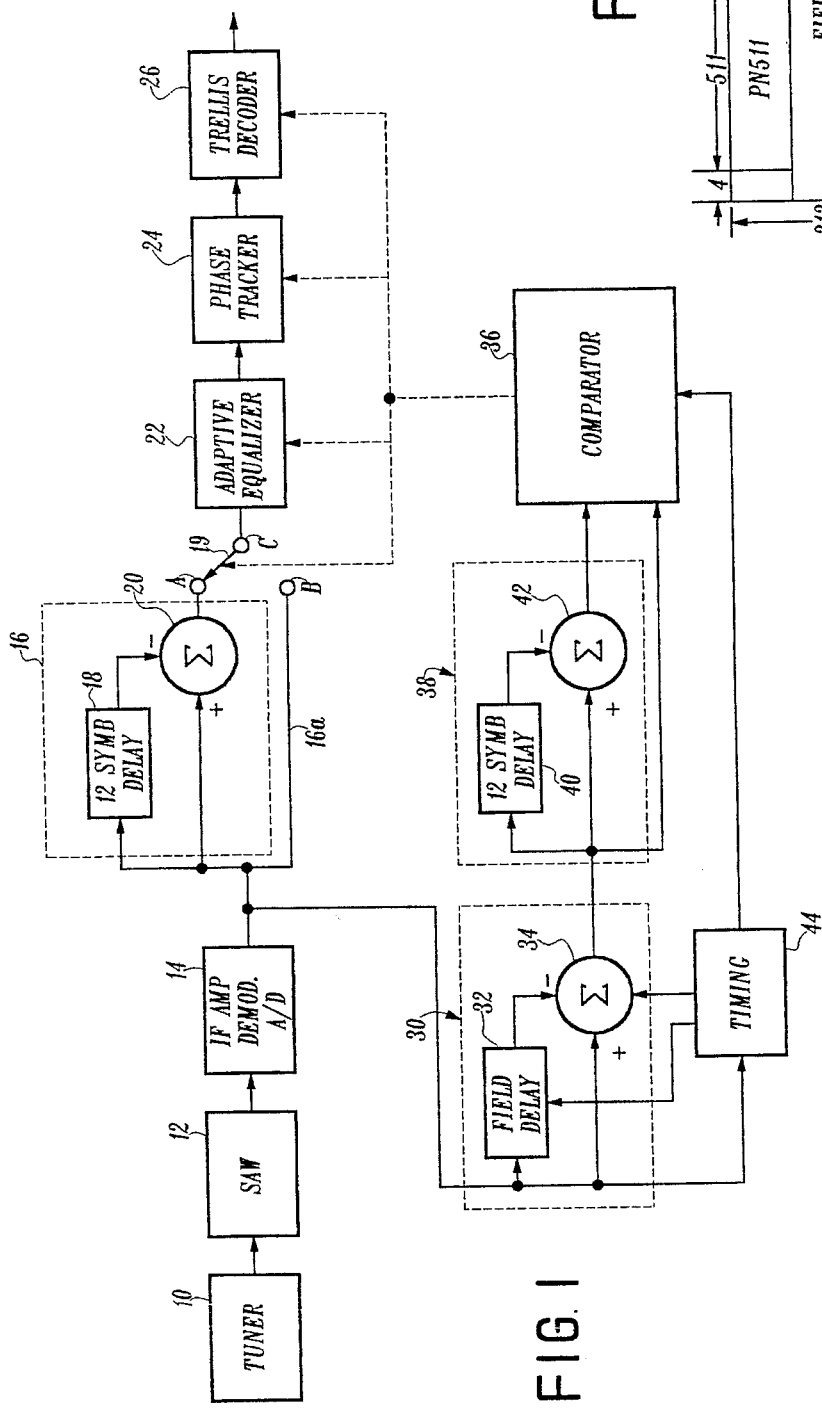
FIG. 1 is a partial block diagram of a receiver constructed in accordance with the invention.
Figure 2:
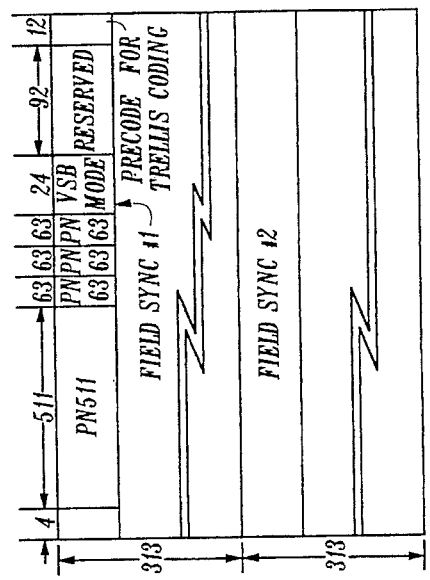
FIG. 2 is a representation of the ATV signal according to the invention.

Referring to FIG. 1 of the drawings, a tuner 10 receives a digitally encoded HDTV signal similar to that described in the above-identified U.S. Pat. No. 5,260,793 and passes it to a SAW filter 12. In the preferred embodiment of the invention, the received signal is encoded using a trellis coded modulation scheme and comprises a plurality of multi bit values representing the amplitudes of the symbols comprising the received ATV signal. The signal is formatted, as shown in FIG. 2, in repetitive data segments of 832 symbols each. Each data frame has a first field segment followed by 312 data segments. Each data segment consists of a four 2-level-symbol data sync followed by 828 data and FEC (forward error correction) symbols. The field sync segments are characterized by a 511 pseudo random number symbol sequence, followed by three 63 pseudo random number symbol sequences, with the middle 63 pseudo random sequence being of inverted polarity in alternating fields. The remainder of the field sync segments have a 24 symbol VSB mode identification, a 92 block of reserved symbols and a 12 symbol precode for the trellis coding. SAW filter 12 is coupled to a block 14, identifying an IF amplifier demodulator and A/D converter, the output of which is coupled to a terminal A of a switch 19 by an NTSC co-channel interference reduction comb filter, indicated by a dashed line block 16, and to a terminal B of switch 19 by a straight-through connection 16a. The comb filter 16, the operation of which is described in more detail in U.S. Pat. No. 5,087,975, consists of a 12 symbol delay 18 and an adder 20. The signal from block 14 is supplied to the positive input of adder 20 and through the delay 18 to the negative input of adder 20. The output terminal C of switch 19 is coupled to an adaptive equalizer 22, the output of which is coupled to a phase tracker 24 (see U.S. Pat. No. 5,406,587). The output of phase tracker 24 is in turn coupled to a trellis decoder 26 which comprises a first processing path including a modulo decoder complementary to the precoder used to encode the received signal (see U.S. Pat. No. 5,087,975) and a second processing path not including the modulo decoder (neither processing path being shown). Switch 19, adaptive equalizer 22, phase tracker 24 and trellis decoder 26 are all operated in response to an output signal from a comparator 36.

The demodulated signal from block 14 is also applied to a field comb circuit 30 (indicated by the dashed line block) and to a timing circuit 44. Timing circuit 44 is coupled to comparator 36 and controls its operation. In particular, timing circuit 44 generates an output signal for enabling comparator 36 during a selected portion of the field sync segment. In a preferred embodiment, this portion comprises the second half of the 511 pseudo random number symbol sequence shown in FIG. 2, the symbols on either side of which (i.e., the first half of the 511 sequence and the first 63 pseudo random number sequence) are invariant from field to field. Field comb 30 may comprise a field delay circuit 32 and an adder 34. The signal from demodulator 14 is applied additively to adder 34 and, through field delay 32, is applied subtractively to adder 34. The result is that pairs of successive fields of the demodulated signal are subtracted at the output of field comb 30. The output of field comb 30 is applied to one input of comparator 36 and also to an NTSC co-channel rejection comb filter circuit 38 (indicated by the dashed line block) similar to filter 16 and which comprises a 12 symbol delay 40 and an adder 42. The output of comb filter 38 is applied to a second input of comparator 36.

In a preferred embodiment of the invention, the delay element 32 of field comb 30 is responsive to a signal from timing circuit 44 and comprises only enough memory for storing the symbols in the second half of the 511 symbol sequence of the field sync segment. The timing circuit 44 also gates adder 34 on only during this portion of the field which corresponds in time with the period during which comparator 36 is enabled. In this manner, not only are the effects of static symbol ghosts and intersymbol interference which carry over from one segment to the other minimized, but a substantive reduction in the required memory capacity of frame comb 30 is achieved.

It will be appreciated that the signal that is transmitted to the television receiver and received and processed by tuner 10 is precoded in anticipation that the ATV receiver will be operated in the area of an NTSC co-channel signal. The precoding of the ATV signal enables appropriate comb filtering in the ATV receiver (e.g., by filter 16) to substantially remove the interference effects of the NTSC co-channel while still allowing the ATV data to be properly recovered. However the use of the comb filter 16 reduces the signal to noise (S/N) ratio of the received ATV signal, which is to be avoided whenever possible. Consequently, it is desirable to bypass comb filter 16 when processing the received signal unless there is substantial co-channel interference.

The field comb 30 is provided for essentially subtracting successive field sync signals (the second half of the 511 symbol sequence of successive frames in the preferred embodiment), which are identical in each field, to develop an error signal. Under ideal conditions, with no co-channel interference and no other interference, the subtraction signal will represent a zero output from field comb 30. It will be appreciated that interference other than static interference, e.g. interference that repeats each field, will not be affected by the field comb 30. White noise, for example, is non uniform and will not cancel. Similarly, phase noise will not cancel and, of course, co-channel noise will not cancel. On the other hand, intersymbol interference, static ghosts and DC offsets will cancel. Thus the subtraction signal represents substantially only co-channel interference, phase noise, white noise and moving ghosts. The subtraction signal is then applied to comparator 36 and compared with the subtraction signal that has been filtered by comb filter 38 to remove NTSC co-channel interference. If there is very little difference between the two compared signals, it may be deduced that there is very little co-channel interference. This information is used to determine the mode of switch 19 for inserting comb filter 16 in the received ATV signal processing path and for controlling the operation of adaptive equalizer 22, phase tracker 24 and trellis decoder 26.

More specifically, the 2-level field sync symbols are converted to 3-level symbols by comb filter 16. The operation of adaptive equalizer 22 and phase tracker 24 must therefore be appropriately controlled depending upon whether switch 19 is operated for applying the direct output of demodulator 14 (2-level sync) or the output of comb filter 16 (3-level sync). Also, trellis decoder 26 must be operated to select the path that includes the complementary modulo decoder if switch 19 is operated for directly applying the output of demodulator 14.

In order to facilitate the foregoing, it is necessary to precisely offset the frequency of the ATV carrier relative to the NTSC picture carrier such that the NTSC signal produced thereby falls on or near a peak of the transfer function of field comb 30. This insures that the phase of the NTSC carrier alternates during successive ATV field sync segments so that the NTSC co-channel signal in successive fields will augment at the output of field comb 30. Comparator 36 is therefore provided with the augmented NTSC co-channel signal substantially free of any ATV components.

What has been described is a novel HDTV receiver for discriminating against NTSC co-channel interference. It is recognized that numerous changes in the described embodiment of the invention will be apparent to those skilled in the art without departing from its true spirit and scope. The invention is to be limited only as defined in the claims.

What is claimed is:

1. A method of receiving an ATV signal comprising a plurality of multi level symbols, having recurrent field sync signals, in an area of co-channel and other interference comprising:

combining corresponding portions of successive ones of said field sync signals to develop a subtraction signal;

processing the subtraction signal to reduce co-channel interference;

comparing the subtraction signal with the processed subtraction signal; and selectively processing the received ATV signal to reduce co-channel interference based upon the comparison.

2. The method of claim 1 wherein the combining comprises field combing the ATV signal to develop the subtraction signal.

3. The method of claim 1 wherein the co-channel interference is NTSC signal related and wherein the processing of the received ATV signal comprises comb filtering.

4. The method of claim 3 wherein the carrier of the ATV signal is offset with respect to the picture carrier of the NTSC co-channel for augmenting NTSC co-channel interference.

5. The method of claim 1 wherein the comparing is confined to corresponding portions of the field sync signals which are isolated by invariant symbols from symbols which may vary from field to field.

6. The method of claim 5 wherein the field sync signal includes a 511 symbol sequence and wherein the corresponding portions comprise a series of symbols near the end of the 511 symbol sequence.

7. The method of claim 6 wherein the corresponding portions comprise the second half of the symbols of the 511 symbol sequence.

8. A method of receiving an ATV signal comprising a plurality of multi level symbols, having recurrent field sync signals, in an area of co-channel and other interference comprising:

field combing said ATV signal field signals to develop a subtraction signal;

processing the subtraction signal to reduce co-channel interference;

comparing a portion of the subtraction signal isolated from symbols which may vary field to field with a corresponding portion of the processed subtraction signal; and selectively processing the received ATV signal to reduce co-channel interference based upon the results of the comparison.

9. The method of claim 8 wherein the co-channel interference is NTSC signal related and wherein the processing of the received ATV signal comprises comb filtering.

10. The method of claim 9 wherein the carrier of the ATV signal is offset with respect to the picture carrier of the NTSC co-channel for augmenting NTSC co-channel interference.

11. The method of claim 9 wherein the field sync signal includes a 511 symbol sequence and wherein the corresponding portions comprise a series of symbols near the end of the 511 symbol sequence.

12. The method of claim 11 wherein the corresponding portions comprise the second half of the symbols of the 511 symbol sequence.

13. A receiver for receiving an ATV signal comprising a plurality of multi level symbols and having recurrent field sync signals in an area of co-channel and other interference comprising:

means for combining corresponding portions of said field sync signals to develop a subtraction signal;

means for processing said subtraction signal to reduce said co-channel interference;

comparison means for comparing said subtraction signal with the processed subtraction signal; and means for selectively processing said received ATV signal for reducing said co-channel interference responsive to said comparison means.

14. The receiver of claim 13 wherein said means for combining comprises a field comb.

15. The receiver of claim 13 wherein said co-channel interference is NTSC signal related and further including a comb filter selectively operated in response to said comparison means for processing said received ATV signal.

16. The receiver of claim 13 wherein said ATV signal has a carrier that is offset with respect to the picture carrier of said NTSC signal, said offset causing augmentation of said NTSC co-channel interference at the output of said comb filter.

17. The receiver of claim 13 wherein said comparing means compares corresponding portions of said subtraction and processed subtraction signals.

18. The receiver of claim 13 wherein said comparing is confined to corresponding portions of the field sync symbols which are isolated by invariant symbols from symbols which may vary from field to field.

19. The receiver of claim 18 wherein said field sync signal includes a 511 symbol sequence followed by at least one shorter symbol sequence and wherein said corresponding portions comprise a series of the symbols near the end of said 511 symbol sequence.

20. A receiver for receiving an ATV signal comprising a plurality of multi level symbols and having recurrent field sync signals in an area of co-channel and other interference comprising:

field comb means for combining corresponding portions of successive ones of said field sync signals for developing a subtraction signal;

means for processing said subtraction signal to reduce said co-channel interference;

comparison means for comparing said corresponding portions of said subtraction signal and said processed subtraction signal; and means for selectively processing said received said ATV signal for reducing said co-channel interference in response to said comparison means.

21. The receiver of claim 20 wherein said co-channel interference is NTSC signal related and further including a comb filter selectively operated in response to said comparison means for processing said received ATV signal.

22. The receiver of claim 21 wherein said ATV signal has a carrier that is offset with respect to the picture carrier of said NTSC signal, said offset causing augmentation of said NTSC co-channel interference at the output of said comb filter.

23. The receiver of claim 21 wherein said field sync signals include a first relatively long symbol sequence followed by at least one relatively short symbol sequence and wherein said corresponding portions comprise a series of the symbols near the end of said relatively long symbol sequence.

* * * * *